United States Patent
Cho et al.

(10) Patent No.: US 9,379,786 B2
(45) Date of Patent: Jun. 28, 2016

(54) NFC TERMINAL AND COMMUNICATION DEVICE INCLUDING THE SAME

(71) Applicant: SAMSUNG ELECTRONICS CO., LTD., Suwon-si, Gyeonggi-do (KR)

(72) Inventors: Jong-Pil Cho, Hwaseong-si (KR); Il-Jong Song, Suwon-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 4 days.

(21) Appl. No.: 14/584,162

(22) Filed: Dec. 29, 2014

(65) Prior Publication Data

US 2015/0188612 A1  Jul. 2, 2015

(30) Foreign Application Priority Data

Dec. 30, 2013  (KR) .......... 10-2013-0167485

(51) Int. Cl.
- *H04B 5/00*  (2006.01)
- *H04B 5/02*  (2006.01)

(52) U.S. Cl.
CPC ............ *H04B 5/02* (2013.01); *H04B 5/0031* (2013.01); *H04B 5/0056* (2013.01)

(58) Field of Classification Search
CPC ........ H04B 5/0031; H04B 5/02; H04W 4/008
USPC ......................... 455/41.1, 130, 287
See application file for complete search history.

(56) References Cited

U.S. PATENT DOCUMENTS

| | | | |
|---|---|---|---|
| 6,515,919 B1 | 2/2003 | Lee | |
| 7,912,430 B2 | 3/2011 | Kargl et al. | |
| 8,244,201 B2 | 8/2012 | Oliver et al. | |
| 8,245,943 B2 | 8/2012 | Uramoto | |
| 8,508,076 B2* | 8/2013 | Kanno | H02J 17/00 307/104 |
| 2005/0191968 A1* | 9/2005 | Tabayashi | G06K 7/10297 455/74 |
| 2007/0026825 A1 | 2/2007 | Wilson | |
| 2007/0046430 A1 | 3/2007 | Yamazaki et al. | |
| 2011/0300799 A1 | 12/2011 | Da Fonseca et al. | |
| 2012/0100804 A1 | 4/2012 | Miles | |
| 2012/0313592 A1 | 12/2012 | Ochoa et al. | |
| 2014/0194055 A1* | 7/2014 | Jones | H04B 5/0056 455/41.1 |

* cited by examiner

*Primary Examiner* — Tuan Pham
(74) *Attorney, Agent, or Firm* — F. Chau & Associates, LLC

(57) ABSTRACT

A near field communication (NFC) terminal includes a first signal generator configured to generate a first received signal using a radio frequency (RF) signal received through an antenna, and generate a reduced first received signal by reducing a size of the first received signal when the size of the first received signal is equal to or greater than a predetermined RF value. The NFC terminal further includes a second signal generator configured to generate a second received signal using the RF signal. The NFC terminal further includes an operation unit configured to generate an operation signal by performing an operation on the reduced first received signal and the second received signal, and transmit the operation signal to a demodulator.

17 Claims, 18 Drawing Sheets

NFC TERMINAL AND COMMUNICATION DEVICE INCLUDING THE SAME

CROSS-REFERENCE TO RELATED APPLICATIONS

This application claims priority under 35 U.S.C. §119 to Korean Patent Application No. 10-2013-0167485, filed on Dec. 30, 2013, the disclosure of which is incorporated by reference herein in its entirety.

TECHNICAL FIELD

Exemplary embodiments of the present inventive concept relate to a near field communication (NFC) terminal and a communication device including the same, and more particularly, to an NFC terminal having a wide radio frequency (RF) range, and a communication device including the same.

DISCUSSION OF THE RELATED ART

Near field communication (NFC) refers to wireless communication which is established by inductive coupling between a radio frequency (RF) field produced by one device and an antenna included in the other device while the communication devices are placed apart from each other within a range of several meters. An NFC terminal may operate in either a reader mode or a card mode. An NFC terminal operating in a reader mode may perform RF wireless communication with another NFC terminal operating in a card mode. An NFC terminal may also perform RF wireless communication while alternating between operating in either a reader mode or a card mode. The strength of an RF field may vary according to the distance between NFC terminals as well as other variables.

SUMMARY

Exemplary embodiments of the inventive concept include a near field communication (NFC) terminal, of which an available radio frequency (RF) range is wide, and a communication device including the same.

According to an exemplary embodiment of the inventive concept, a near field communication (NFC) terminal includes a first signal generator that generates a first received signal from a radio frequency (RF) signal that is received through an antenna, and generates, when a size of the first received signal is equal to or greater than a first value, a reduced first received signal by reducing the size of the first received signal. The NFC terminal further includes a second signal generator that generates a second received signal from the RF signal, and an operation unit that generates an operation signal by performing an operation on the reduced first received signal and the second received signal and transmits the operation signal to a demodulator.

The first signal generator may include a rectifier that generates the first received signal from the RF signal, a shunt regulator that generates a shunt signal of the first received signal when the size of the first received signal is equal to or greater than a first value, a current mirror that generates a first shunt current and a second shunt current by reproducing the shunt signal of the first received signal, a first current-voltage converter that generates a field signal by using the first shunt current, and a second current-voltage converter that generates the reduced first received signal based on the second shunt current.

The second signal generator may include an envelope detector that detects an envelope of the RF signal to generate an envelope signal, and a high pass filter that generates the second received signal by high-pass filtering the envelope signal.

The NFC terminal may further include a field measurement unit that generates a field measurement signal by receiving a field signal and measuring a strength of the RF signal, and a control unit that generates a first control signal corresponding to the field measurement signal, wherein the first signal generator generates the field signal from the first received signal.

The NFC terminal may further include a received voltage control unit that adjusts a strength of a received voltage of the antenna by using a third control signal, and the control unit may further generate the third control signal corresponding to the field measurement signal.

The control unit may further generate a fourth control signal corresponding to the field measurement signal, and the first signal generator may further include a sink circuit that reduces a size of the first received signal by using the fourth control signal.

The operation unit may be a multiplexer that generates the operation signal by selecting the reduced first received signal or the second received signal according to the first control signal.

The second signal generator may include an envelope detector that detects an envelope of the RF signal to generate an envelope signal, a high pass filter that generates a filtering signal by high-pass filtering the envelope signal, and an amplifier that generates the second received signal by amplifying the filtering signal.

The control unit may generate a second control signal according to the field measurement signal, and the amplifier may amplify the filtering signal according to the second control signal.

The operation unit may be a multiplexer that generates the operation signal by selecting one of the first received signal, the second received signal, and the filtering signal according to the first control signal.

The operation unit may generate an arithmetic summation of the reduced first received signal and the second received signal as the operation signal.

The first signal generator may include a rectifier that generates the first received signal from the RF signal, a shunt regulator that generates, when the size of the first received signal is equal to or greater than the first value, the reduced first received signal by using a shunt signal of the first received signal, a current mirror that generates a first shunt current by reproducing the reduced first received signal, and a first current-voltage converter that generates a field signal based on the first shunt current.

According to an exemplary embodiment of the inventive concept, a near field communication (NFC) terminal includes a first signal generator that generates a first received signal from a radio frequency (RF) signal received through an antenna, and generates, when a size of the first received signal is equal to or greater than a first value, a reduced first received signal by reducing the size of the first received signal. The NFC terminal further includes a second signal generator that generates a second received signal from the RF signal, and an operation unit that generates an operation signal by performing an operation on the reduced first received signal and the second received signal, and transmits the operation signal to a demodulator.

The first signal generator may include a rectifier that generates the first received signal from the RF signal, a shunt regulator that generates, when the size of the first received signal is equal to or greater than the first value, a shunt signal of the first received signal, a current mirror that generates a first shunt current and a second shunt current by reproducing the first received signal, a first current-voltage converter that generates a field signal by using the first shunt current, and a second current-voltage converter that generates the reduced first received signal by using the second shunt current.

The second signal generator may include an envelope detector that generates an envelope signal by detecting an envelope of the RF signal, and a high pass filter that generates the second received signal by high-pass filtering the envelope signal.

According to an exemplary embodiment of the present invention, a near field communication (NFC) terminal includes a first signal generator configured to generate a first received signal based on a radio frequency (RF) signal, and generate a reduced first received signal by reducing a size of the first received signal when the size of the first received signal is equal to or greater than a predetermined value. The NFC terminal further includes a second signal generator configured to generate a second received signal based on the RF signal, an envelope signal obtained by detecting an envelope of the RF signal, and a filtering signal obtained by high-pass filtering the envelope signal. The NFC terminal further includes an operation unit configured to generate an operation signal by summing the reduced first received signal, the second received signal, and the filtering signal.

The reduced first received signal, the second received signal and the filtering signal may be different from each other.

The first received signal may be generated by rectifying the RF signal.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
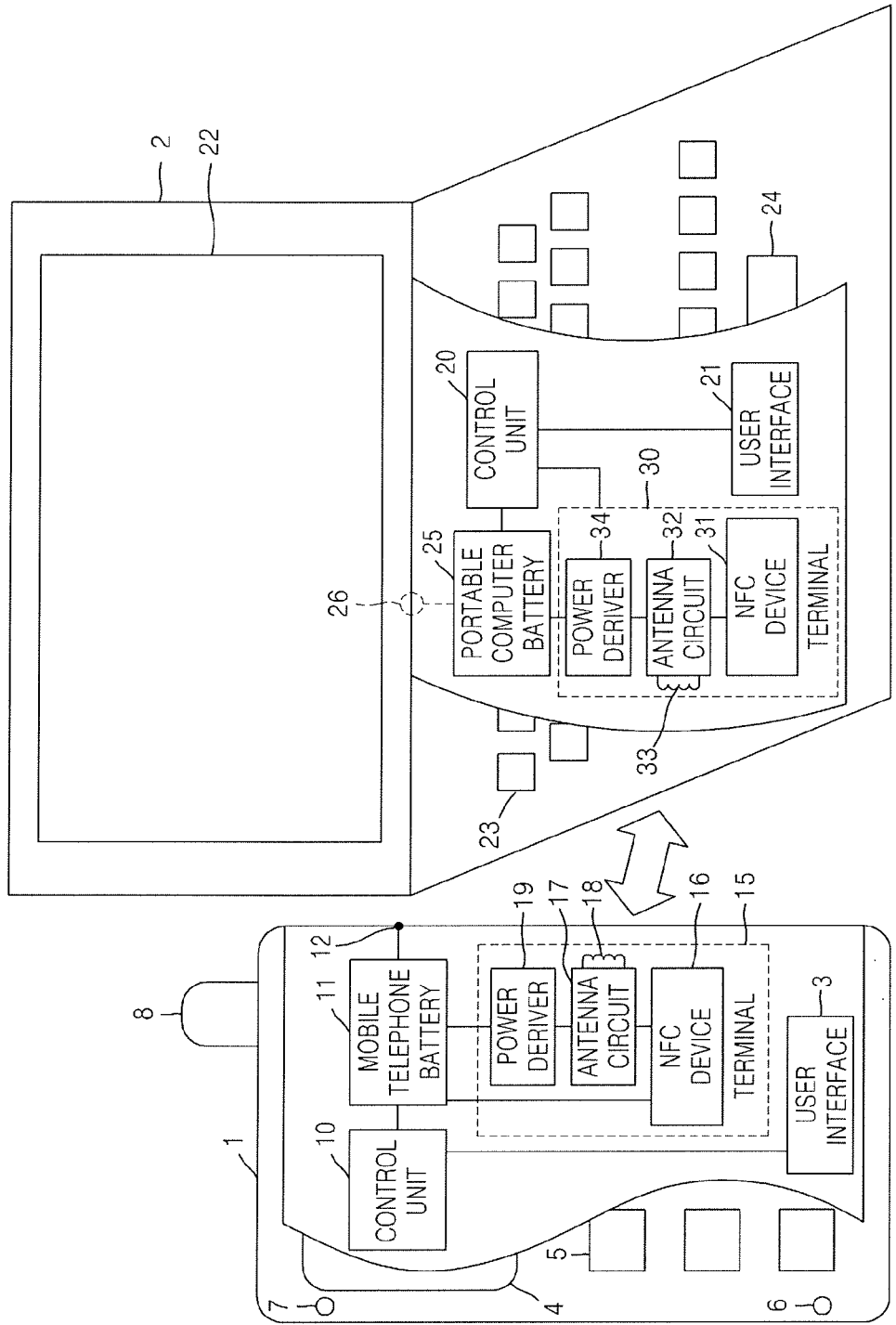
FIG. 1 is a diagram illustrating near field communication (NFC) between two NFC devices each including an NFC terminal according to an exemplary embodiment of the inventive concept.

Exemplary embodiments of the inventive concept will be described more fully with reference to the accompanying drawings. Like reference numerals may refer to like elements throughout the drawings, and the sizes of components in the drawings may be exaggerated for convenience of explanation.

FIG. 1 illustrates near field communication (NFC) between two NFC communication devices including NFC terminals according to an exemplary embodiment of the present inventive concept.

Referring to FIG. 1, structures of NFC communication devices 1 and 2 are described with reference to block diagrams shown inside the NFC communication devices 1 and 2. As shown in FIG. 1, the first NFC communication device 1 may be, for example, a cell phone, and the second NFC communication device 2 may be, for example, a portable computer such as a notebook computer or a laptop computer. However, the NFC communication devices 1 and 2 are not limited thereto.

The first NFC communication device 1 may include a user interface 3, a display 4, a keypad 5, a microphone 6, a speaker 7, an antenna 8, a control unit 10, a battery 11, and a battery socket 12. The antenna 8 may connect the first NFC communication device 1 to a mobile communication network. The control unit 10 may include a microprocessor capable of processing data related to a subscriber identification module (SIM) card, and a memory storage device capable of storing data. The battery 11 may supply power to a first NFC terminal 15.

The second NFC communication device 2 may include a control unit 20, a user interface 21, a display 22, a keyboard 23, a touch pad 24, a battery 25, and a battery socket 26. The battery 25 may be a main power supply of a second NFC terminal 30.

The first NFC terminal 15 and the second NFC terminal 30 are connected to the first NFC communication device 1 and the second NFC communication device 2, respectively. According to exemplary embodiments, the first and second NFC terminals 15 and 30 may be respectively separated from or integrally connected to the first NFC communication device 1 and the second NFC communication device 2.

The first NFC terminal 15 may include a first NFC device 16. The second NFC terminal 30 may include a second NFC device 31. The first NFC device 16 and the second NFC device 31 may control NFC functions and control generation, modulation, and demodulation of a radio frequency (RF) signal for the first and second NFC communication devices 1 and 2. According to exemplary embodiments, the first NFC terminal 15 and the second NFC terminal 30 may include some and/or all of the components of NFC terminals 100 through 800 shown in FIG. 2 through FIG. 19, which are described in further detail below.

The first NFC terminal 15 may include an antenna circuit 17, and the antenna circuit 17 may include an antenna 18. In addition, the second NFC terminal 30 may include an antenna circuit 32, and the antenna circuit 32 may include an antenna 33. When the antenna 18 of the first NFC terminal 15 is within range of an RF field created by the second NFC terminal 30, the antenna circuit 17 of the first NFC terminal 15 is inductively coupled to the second NFC terminal 30 by an alternating magnetic field produced by the antenna 18 of the first NFC terminal 15 through RF signal transmission. In addition, when the antenna 33 of the second NFC terminal 30 is within range of an RF field created by the first NFC terminal 15, the antenna circuit 32 of the second NFC terminal 30 is inductively coupled to the first NFC terminal 15 by an alternating magnetic field produced by the antenna 33 of the second NFC terminal 30 through RF signal transmission.

The first NFC terminal 15 may activate control signals and/or data exchanged between the first NFC terminal 15 and the first NFC communication device 1 via the control unit 10, and may input user input to the first NFC terminal 15. The second NFC terminal 30 may activate control signals and/or data exchanged between the second NFC terminal 30 and the second NFC communication device 2 via the control unit 20, and may input user input to the second NFC terminal 30.

The first NFC terminal 15 may include a power deriver 19, and the second NFC terminal 30 may include a power deriver 34. The power derivers 19 and 34 may receive power from the batteries 11 and 25, respectively.

The first NFC communication device 1 and the second NFC communication device 2 are illustrated in FIG. 1 as being a cell phone and a portable computer, respectively. However, the first and second NFC communication devices 1 and 2 are not limited thereto. For example, the first and second NFC communication devices 1 and 2 may be any portable devices or portable communication electronic devices. For example, the first and second NFC communication devices 1 and 2 may be implemented as a laptop computer, a mobile phone, a smartphone, a tablet personal computer (tablet PC), a personal digital assistant (PDA), an enterprise digital assistant (EDA), a digital still camera, a digital video camera, a portable multimedia player (PMP), a personal or portable navigation device (PND), a handheld game console, a mobile internet device (MID), an electronic book (e-book), etc. In addition, the first NFC terminal 15 and the second NFC terminal 30 may be implemented as independent appliances.

Figure 2:
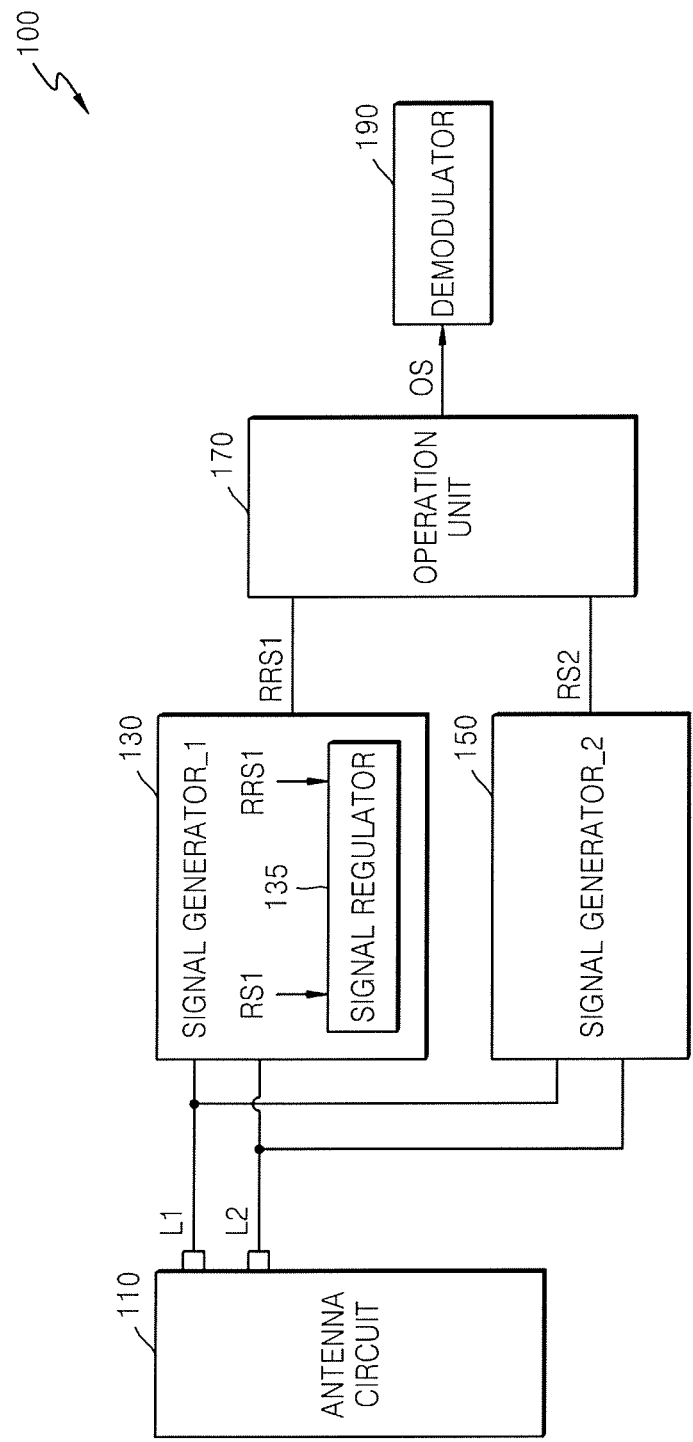
FIG. 2 is a block diagram illustrating an NFC terminal according to an exemplary embodiment of the inventive concept.

FIG. 2 is a block diagram illustrating an NFC terminal 100 according to an exemplary embodiment of the inventive concept.

Referring to FIG. 2, the NFC terminal 100 includes an antenna circuit 110, a first signal generator 130, a second signal generator 150, an operation unit 170, and a demodulator 190.

The antenna circuit 110 receives an RF signal generated by another NFC terminal. The RF signal is received by the first signal generator 130 and the second signal generator 150 through receiving ends L1 and L2, respectively.

The first signal generator 130 may receive an RF signal and generate a first received signal RS1 using the RF signal. The first received signal RS1 may be, for example, a signal obtained by rectifying an RF signal. The first signal generator 130 may include a signal regulator 135. The first signal generator 130 may be included, for example, in the power deriver 19 or 34 shown in FIG. 1. When the signal regulator 135 receives the first received signal RS1, and the size of the first received signal RS1 is equal to or greater than a first value (e.g., a predetermined RF value), the signal regulator 135 reduces the size of the first received signal RS1 to generate a reduced first received signal RRS1. That is, upon determining that the size of the first received signal RS1 is equal to or greater than the first value, the signal regulator 135 reduces the size of the first received signal RS1 to generate the reduced first received signal RRS1. The first signal generator 130 may transmit the reduced first received signal RRS1 to the operation unit 170.

The second signal generator 150 may receive the RF signal and generate a second received signal RS2. According to exemplary embodiments, a method of generating the second received signal RS2 using the second signal generator 150 may differ from a method of generating the first received signal RS1 using the first signal generator 130. The second signal generator 150 may be included, for example, in the NFC device 16 or 31 shown in FIG. 1. The second signal generator 150 may transmit the second received signal RS2 to the operation unit 170.

The operation unit 170 performs an operation on the reduced first received signal RRS1 and the second received signal RS2 to generate an operation signal OS. A method of performing an operation on the reduced first received signal RRS1 and the second received signal RS2 using the operation unit 170 will be described in detail below. A result of the operation performed on the reduced first received signal RRS1 and the second received signal RS2 may vary according to, for example, the strength of the RF signal. The performed operation includes, for example, an arithmetic or logical operation. For example, the operation unit 170 may select one of the reduced first received signal RRS1 and the second received signal RS2 to perform a logical operation on the selected signal. For example, the operation unit 170 may generate a sum of the reduced first received signal RRS1 and the second received signal RS2 as an operation signal.

The demodulator 190 may receive the operation signal OS and demodulate the operation signal OS to binary data DEMS.

Accordingly, the NFC terminal 100 according to an exemplary embodiment of the inventive concept may generate the reduced first received signal RRS1 and the second received signal RS2 using different methods according to the strength of an RF signal, and may perform an operation on the reduced first received signal RRS1 and the second received signal RS2 according to the strength of the RF signal. As a result, an operating range of the NFC terminal 100 may be increased.

Figure 3:
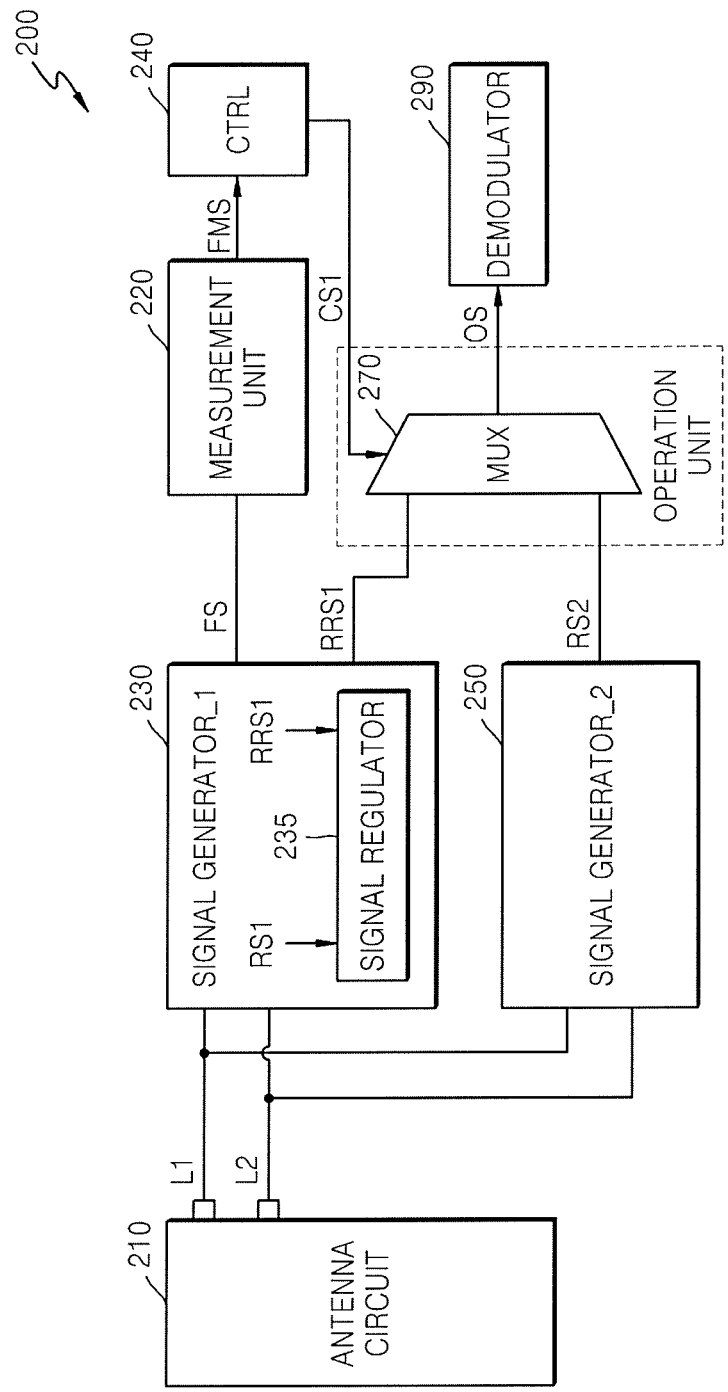
FIG. 3 is a block diagram illustrating an NFC terminal according to an exemplary embodiment of the inventive concept.

FIG. 3 is a block diagram illustrating an NFC terminal 200 according to an exemplary embodiment of the inventive concept.

Referring to FIG. 3, the NFC terminal 200 includes an antenna circuit 210, a first signal generator 230, a second signal generator 250, an operation unit 270, and a demodulator 290. The first signal generator 230 may include a signal regulator 235. In addition, the NFC terminal 200 may include a field measurement unit 220 and a control unit 240. The first signal generator 230, the second signal generator 250, and the demodulator 290 may respectively have the same structures as the first signal generator 130, the second signal generator 150, and the demodulator 190 of FIG. 2. For convenience of explanation, a description of elements and processes previously described may be omitted.

The first signal generator 230 may generate a field signal FS using the first received signal RS1. According to exemplary embodiments, the field signal FS may be the same signal as the reduced first received signal RRS1 or the first received signal RS1, or may be a different signal generated by processing the reduced first received signal RRS1 and the first received signal RS1.

The field measurement unit 220 may generate a field measurement signal FMS using the field signal FS, and may measure the strength of the RF signal. The control unit 240 may receive the field measurement signal FMS and may use the field measurement signal FMS to detect the strength of an RF field. The control unit 240 may also use the field measurement signal FMS to generate a first control signal CS1. The first control signal CS1 may be, for example, a binary control signal.

According to the exemplary embodiment of the inventive concept shown in FIG. 3, the operation unit 270 may be, for example, a 2:1 multiplexer which selects the reduced first received signal RRS1 or the second received signal RS2 according to the first control signal CS1. For example, if the strength of an RF field is equal to or greater than a first value (e.g., a predetermined RF value), the first control signal CS1 may include information used to select the reduced first received signal RRS1. If the strength of an RF field is less than the first value, the first control signal CS1 may include information used to select the second received signal RS2.

Figure 4:
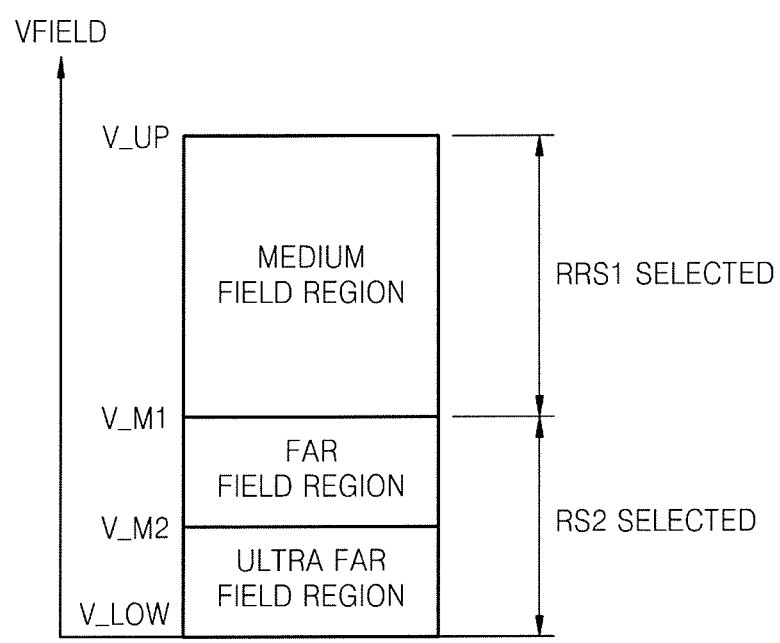
FIG. 4 is a graph showing signals which are selected according to a first control signal in the exemplary embodiment shown in FIG. 3 according to the strength of an RF field.

FIG. 4 is a graph illustrating signals which are selected according to the first control signal CS1 shown in the exemplary embodiment of FIG. 3 according to the strength of an RF field.

Referring to FIG. 4, in an exemplary embodiment, if the strength of an RF field is less than V_UP and greater than V_M1, the RF field is determined to be a medium range field, and the operation unit 270 selects the reduced first received signal RRS1. If the strength of the RF field is less than V_M1 and greater than V_M2, the RF field is determined to be a far range field, and the operation unit 270 selects the second received signal RS2. If the strength of the RF field is less than V_M2 and greater than V_LOW, the RF field is determined to be an ultra far range field, and the operation unit 270 selects the second received signal RS2. The ultra range field corresponds to a range larger than the far range field, and the far range field corresponds to a range larger than the medium range field. This process is described in further detail with reference to FIG. 16.

Accordingly, the NFC terminal 200 according to the present exemplary embodiment of the inventive concept may increase an operating range thereof by performing a logical operation whereby the reduced first received signal RRS1 or the second received signal RS2 is selected according to the strength of an RF signal.

Figure 5:
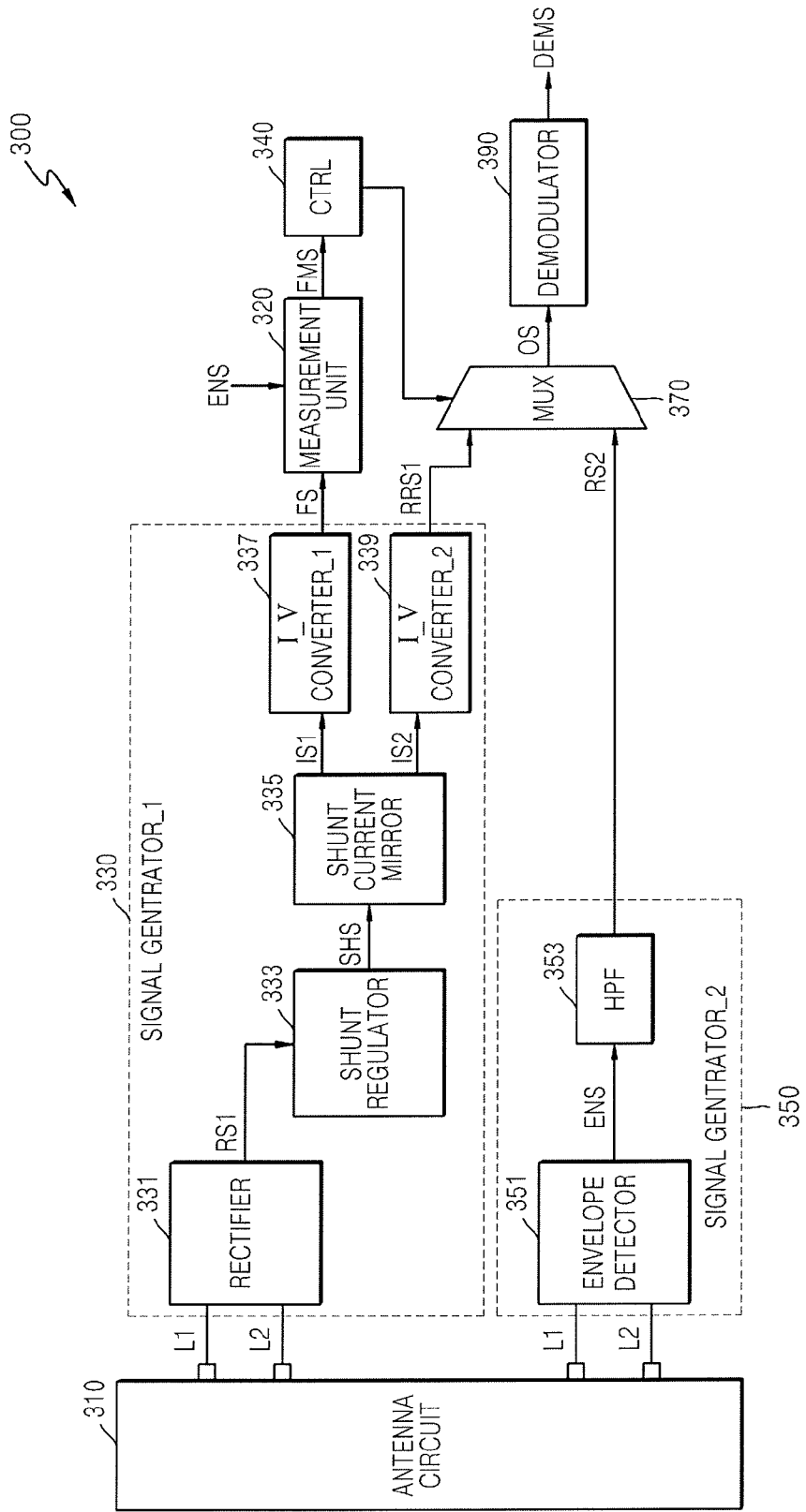
FIG. 5 is a block diagram illustrating an NFC terminal according to an exemplary embodiment of the inventive concept.

FIG. 5 is a block diagram illustrating an NFC terminal 300 according to an exemplary embodiment of the inventive concept.

Referring to FIG. 5, the NFC terminal 300 includes an antenna circuit 310, a first signal generator 330, a second signal generator 350, an operation unit 370 (e.g., a multiplexer), and a demodulator 390. In addition, the NFC terminal 300 may further include a field measurement unit 320 and a control unit 340. The field measurement unit 320, the control unit 340, the operation unit 370, and the demodulator 390 may respectively have the same structures as the field measurement unit 220, the control unit 240, the operation unit 270, and the demodulator 290 of FIG. 3. For convenience of explanation, a description of elements and processes previously described may be omitted.

The first signal generator 330 may include a rectifier 331, a shunt regulator 333, a shunt current mirror 335, a first current-voltage converter 337, and a second current-voltage converter 339.

The rectifier 331 rectifies an RF signal and generates a first received signal RS1 using the RF signal. The first received signal RS1 may be a direct current (DC) signal. When the size of the first received signal RS1 is equal to or greater than a first value (e.g., a predetermined shunt value), the shunt regulator 333 may generate a shunt signal SHS by shunting the first received signal RS1. That is, upon determining that the size of the first received signal RS1 is equal to or greater than the first value, the shunt regulator 333 may generate the shunt signal SHS by shunting the first received signal RS1. For example, in an exemplary embodiment, when the size of the first received signal RS1 is equal to or greater than the first value, the shunt regulator 333 may generate a shunt signal SHS according to a result obtained by subtracting the first value from the first received signal RS1. When the size of the first received signal RS1 is less than the first value, the shunt regulator 333 may generate a shunt signal SHS having a predetermined value. That is, upon determining that the size of the first received signal RS1 is less than the first value, the shunt regulator 333 may generate the shunt signal SHS having a predetermined value rather than by shunting the first received signal RS1.

The shunt current mirror 335 may generate a first shunt current IS1 and a second shunt current IS2 based on the shunt signal SHS. The first current-voltage converter 337 may generate a field signal FS using the first shunt current IS1. The second current-voltage converter 339 may generate a reduced first received signal RRS1 using the second shunt current IS2.

Figure 6:
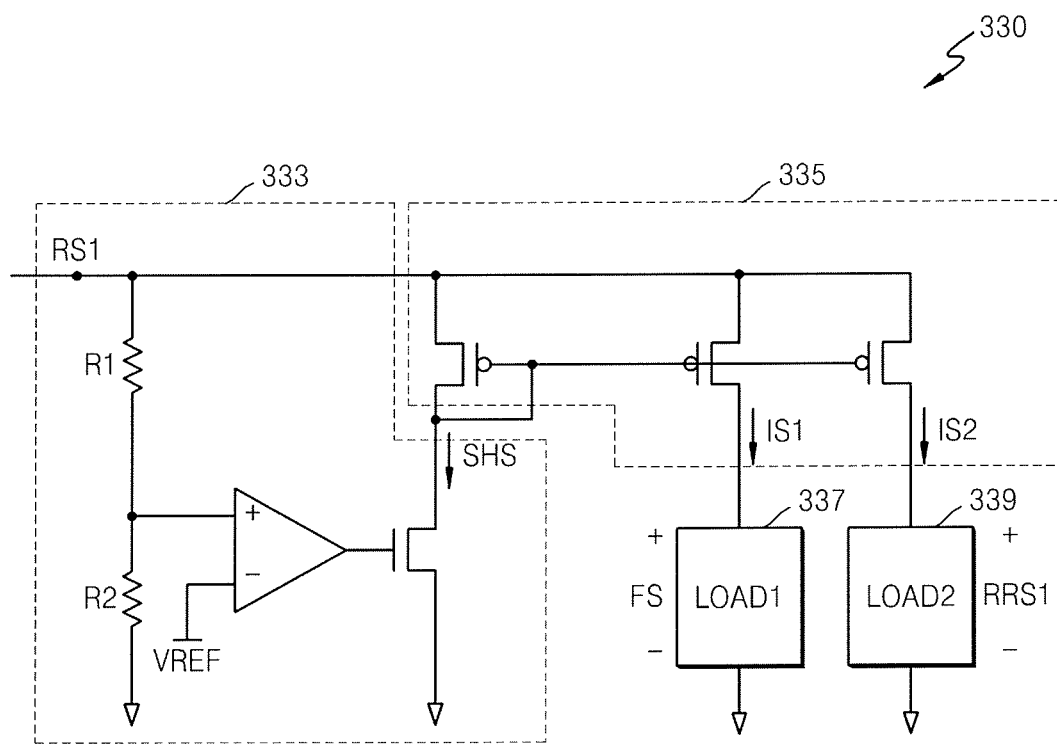
FIG. 6 is an exemplary circuit diagram illustrating components included in a signal generator of FIG. 5 according to an exemplary embodiment of the inventive concept.

FIG. 6 is an exemplary circuit diagram illustrating each component of the first signal generator 330 in FIG. 5 according to an exemplary embodiment of the inventive concept.

Referring to FIG. 6, the first received signal RS1 is a voltage signal, and the shunt signal SHS is a current signal. The first value described with reference to FIG. 5 may be equal to VREF(R1+R2)/R2, where VREF, R1 and R2 respectively correspond to a reference voltage and resistance values of resistors in the shunt regulator 333, as shown in FIG. 6. The first shunt current IS1 and the second shunt current IS2 are electric currents obtained by reproducing the shunt signal SHS. The field signal FS is a voltage which is applied to a load LOAD1 (e.g., a load at the first current-voltage converter 337), and the reduced first received signal RRS1 is a voltage which is applied to a load LOAD2 (e.g., a load at the second current-voltage converter 339). Although the exemplary embodiment shown in FIG. 6 illustrates the reduced first received signal RRS1 being sent only to the load LOAD2, exemplary embodiments of the inventive concept are not limited thereto. For example, the second shunt current IS2 may be reproduced, and a plurality of resistors to which the reproduced current is applied may be included.

Referring again to FIG. 5, the second signal generator 350 may include an envelope detector 351 and a high pass filter 353.

The envelope detector 351 may detect an envelope of the RF signal to generate an envelope signal ENS. The envelope signal ENS may be input to the field measurement unit 320. The envelope signal ENS may pass through the high pass filter 353 to become the second received signal RS2. That is, in an exemplary embodiment, the high pass filter 353 may generate the second received signal RS2 by high-pass filtering the envelope signal ENS. The second received signal RS2 may be an input to the operation unit 370.

As described above, the first signal generator 330 and the second signal generator 350 may process an RF signal in a different manner. In addition, if an RF signal is strong, the reduced first received signal RRS1 generated using the first signal generator 330 may be demodulated, and if the RF signal is weak, the second received signal RS2 generated using the second signal generator 350 may be demodulated. Accordingly, an RF signal may be demodulated over a relatively wide strength range of an RF field.

Figure 7:
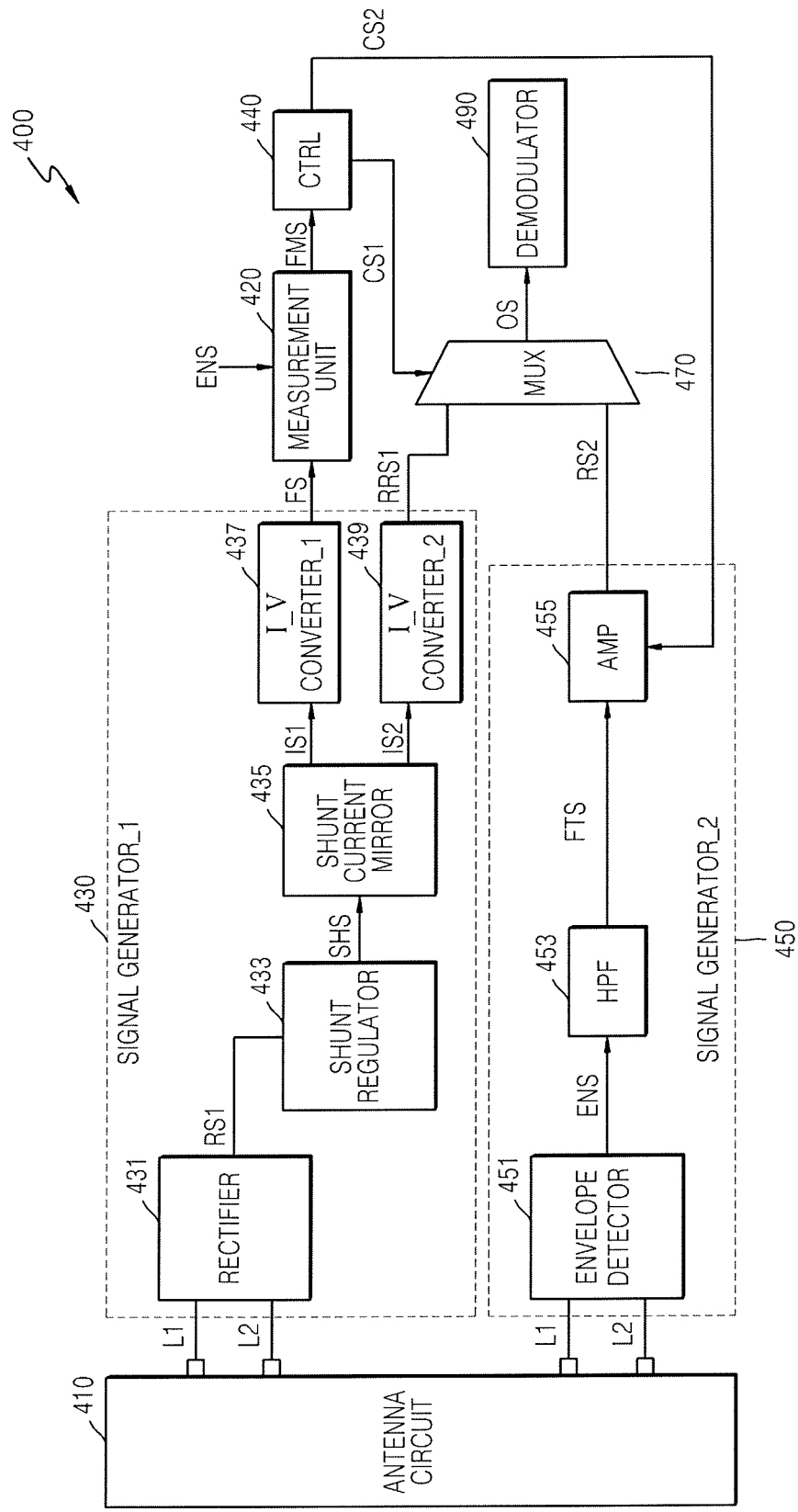
FIG. 7 is a block diagram illustrating an NFC terminal according to an exemplary embodiment of the inventive concept.

FIG. 7 is a block diagram illustrating an NFC terminal 400 according to an exemplary embodiment of the inventive concept.

Referring to FIG. 7, the NFC terminal 400 includes an antenna circuit 410, a first signal generator 430, a second signal generator 450, an operation unit 470 (e.g., a multiplexer), and a demodulator 490. The NFC terminal 400 may further include a field measurement unit 420 and a control unit 440. The antenna circuit 410, the field measurement unit 420, the first signal generator 430, the control unit 440, the operation unit 470, and the demodulator 490 may respectively have the same structures as the antenna circuit 310, the field measurement unit 320, the first signal generator 330, the control unit 340, the operation unit 370, and the demodulator 390 of FIG. 5. Referring to the first signal generator 430, a rectifier 431, a shunt regulator 433, a shunt current mirror 435, a first current-voltage converter 437, and a second current-voltage converter 439 may respectively have the same structures as the rectifier 331, the shunt regulator 333, the shunt current mirror 335, the first current-voltage converter 337, and the second current-voltage converter 339 of FIG. 5. Referring to the second signal generator 450, an envelope detector 451 and a high pass filter 453 may respectively have the same structures as the envelope detector 351 and the high pass filter 353 of FIG. 5. For convenience of explanation, a description of elements and processes previously described may be omitted.

Figure 8:
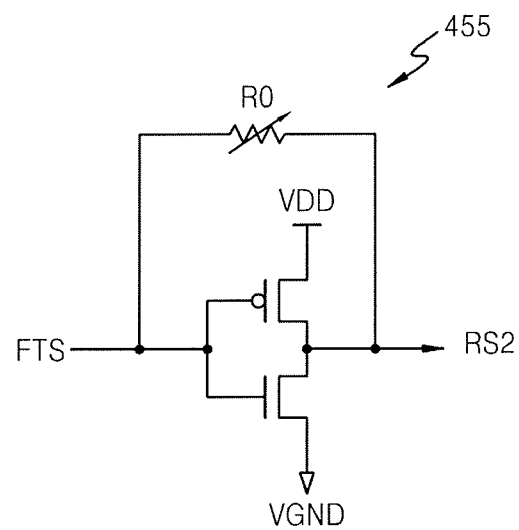
FIG. 8 is a detailed circuit diagram illustrating an amplifier of FIG. 7 according to an exemplary embodiment of the inventive concept.

The second signal generator 450 may include an amplifier 455. The amplifier 455 may receive a second control signal CS2 from the control unit 440 and amplify a filtering signal FTS to generate a second received signal RS2. The amplifier 455 may be implemented as illustrated in the circuit diagram of FIG. 8. As shown in FIG. 8, the amplifier 455 may include, for example, transistors connected to a voltage VDD and a ground voltage VGND, and a variable resistor R0.

Figure 9:
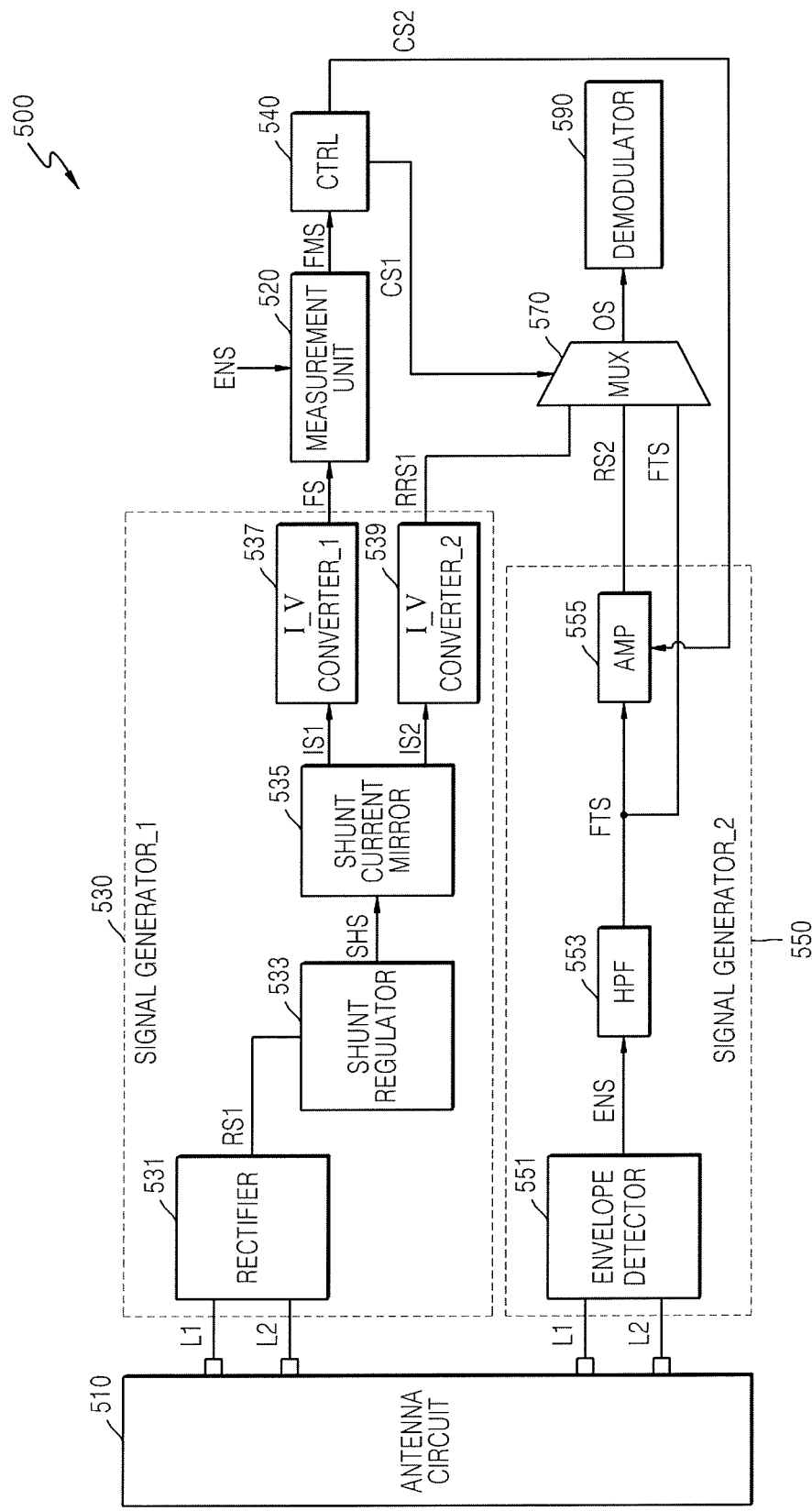
FIG. 9 is a block diagram illustrating an NFC terminal according to an exemplary embodiment of the inventive concept.

FIG. 9 is a block diagram illustrating an NFC terminal 500 according to an exemplary embodiment of the inventive concept.

Referring to FIG. 9, the NFC terminal 500 includes an antenna circuit 510, a first signal generator 530, a second signal generator 550, an operation unit 570 (e.g. a multiplexer), and a demodulator 590. The NFC terminal 500 may further include a field measurement unit 520 and a control unit 540. The antenna circuit 510, the field measurement 520, the first signal generator 530, the control unit 540, and the demodulator 590 may respectively have the same structures as the antenna circuit 410, the field measurement unit 420, the first signal generator 430, the control unit 440, and the demodulator 490 of FIG. 7. Referring to the first signal generator 530, a rectifier 531, a shunt regulator 533, a shunt current mirror 535, a first current-voltage converter 537, and a second current-voltage converter 539 may respectively have the same structures as the rectifier 431, the shunt regulator 433, the shunt current mirror 435, the first current-voltage converter 437, and the second current-voltage converter 439 of FIG. 7. Referring to the second signal generator 550, an envelope detector 551, a high pass filter 553, and an amplifier 555 may have the same structures as the envelope detector 451, the high pass filter 453, and the amplifier 455 of FIG. 7. For convenience of explanation, a description of elements and processes previously described may be omitted.

The operation unit 570 may receive a filtering signal FTS from the second signal generator 550. The operation unit 570 may receive a first control signal CS1 from the control unit 540 to select one of a reduced first received signal RRS1, a second received signal RS2, and the filtering signal FTS. The first control signal CS1 may include information regarding which signal to select from among the reduced first received signal RRS1, the second received signal RS2, and the filtering signal FTS, according to the strength of an RF field.

Figure 10:
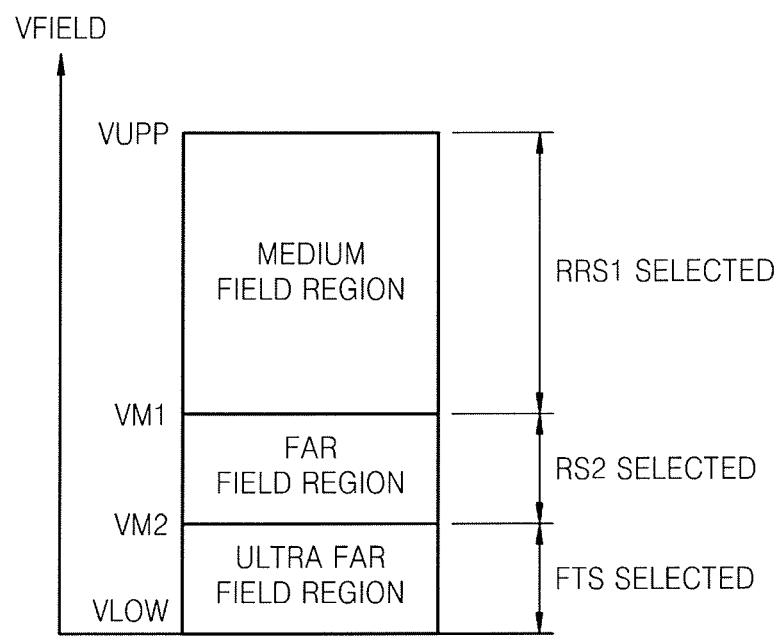
FIG. 10 is a graph illustrating signals which are selected according to a first control signal in the exemplary embodiment shown in FIG. 9 according to the strength of an RF field.

FIG. 10 is a graph illustrating signals which are selected according to the first control signal CS1 shown in the exemplary embodiment of FIG. 9 according to the strength of an RF field.

Referring to FIG. 10, if the RF field is between VUPP and VM1, the RF field is determined to be a medium range field, and the reduced first received signal RRS1 is selected. If the RF field is between VM1 and VM2, the RF field is determined to be a far range field, and the second received signal RS2 is selected. If the RF field is between VM2 and VLOW, the RF field is determined to be an ultra far range field, and the filtering signal FTS is selected. The ultra range field corresponds to a range larger than the far range field, and the far range field corresponds to a range larger than the medium range field. This process is described in further detail with reference to FIG. 16.

Figure 11:
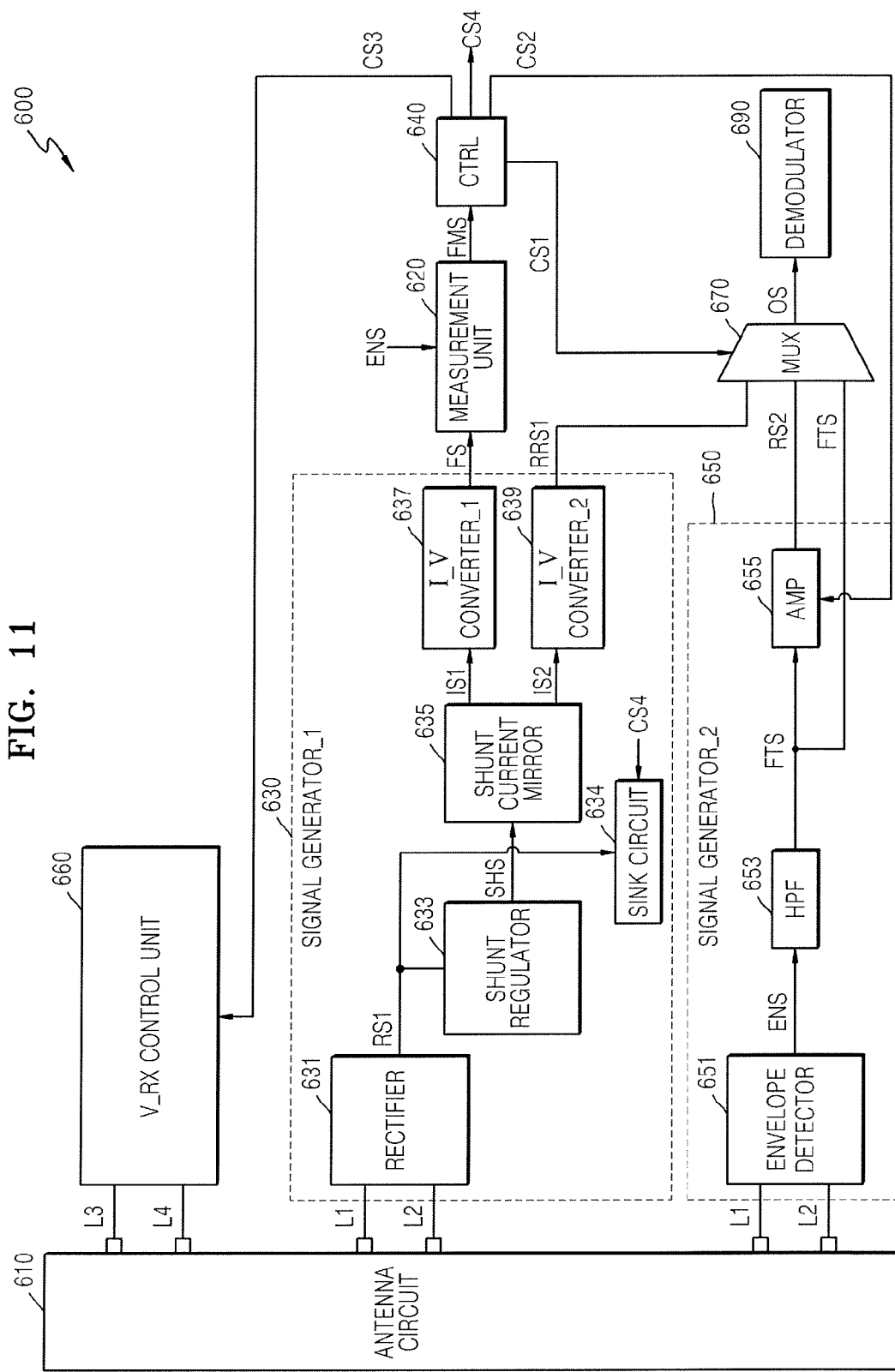
FIG. 11 is a block diagram illustrating an NFC terminal according to an exemplary embodiment of the inventive concept.
Figure 12:
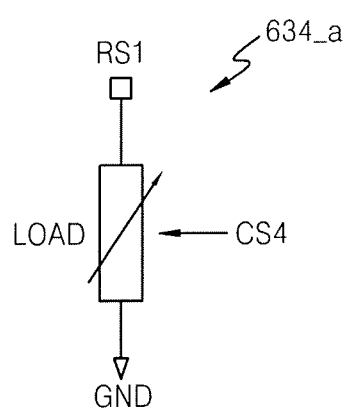
FIGS. 12 and 13 are detailed diagrams illustrating a sink circuit of FIG. 11 according to exemplary embodiments of the inventive concept.
Figure 13:
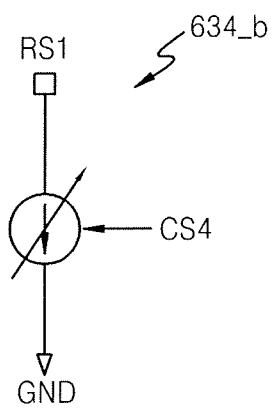

FIG. 11 is a block diagram illustrating an NFC terminal 600 according to an exemplary embodiment of the inventive concept.

Referring to FIG. 11, the NFC terminal 600 includes an antenna circuit 610, a first signal generator 630, a second signal generator 650, an operation unit 670 (e.g., a multiplexer), and a demodulator 690. The NFC terminal 600 may further include a field measurement unit 620, a control unit 640, and a received voltage control unit 660. The antenna circuit 610, the field measurement 620, the control unit 640, the second signal generator 650, the operation unit 670, and the demodulator 690 may respectively have the same structures as the antenna circuit 510, the measurement unit 520, the control unit 540, the second signal generator 550, the operation unit 570, and the demodulator 590 of FIG. 9. Referring to the first signal generator 630, a rectifier 631, a shunt regulator 633, a shunt current mirror 635, a first current-voltage converter 637, and a second current-voltage converter 639 may respectively have the same structures as the rectifier 531, the shunt regulator 533, the shunt current mirror 535, the first current-voltage converter 537, and the second current-voltage converter 539 of FIG. 9. Referring to the second signal generator 650, an envelope detector 651, a high pass filter 653, and an amplifier 655 may have the same structures as the envelope detector 551, the high pass filter 553, and the amplifier 555 of FIG. 9. For convenience of explanation, a description of elements and processes previously described may be omitted.

The first signal generator 630 further includes a sink circuit 634. The sink circuit 634 performs the function of reducing a Q value (a quality factor) of the antenna circuit 610 such that a current that is shunted to a shunt signal SHS when the strength of an RF field is relatively small. The sink circuit 634 may control a level of reduction of the Q value by receiving a fourth control signal CS4 generated by the control unit 640. The sink circuit 634 may be implemented as the circuits 634_a and 634_b illustrated in FIGS. 12 and 13.

The received voltage control unit 660 receives a third control signal CS3 to adjust (e.g., reduce) a strength of an RF signal received using the antenna circuit 610. The received voltage control unit 660 is connected to the antenna circuit 610 through receiving ends L3 and L4.

Figure 14:
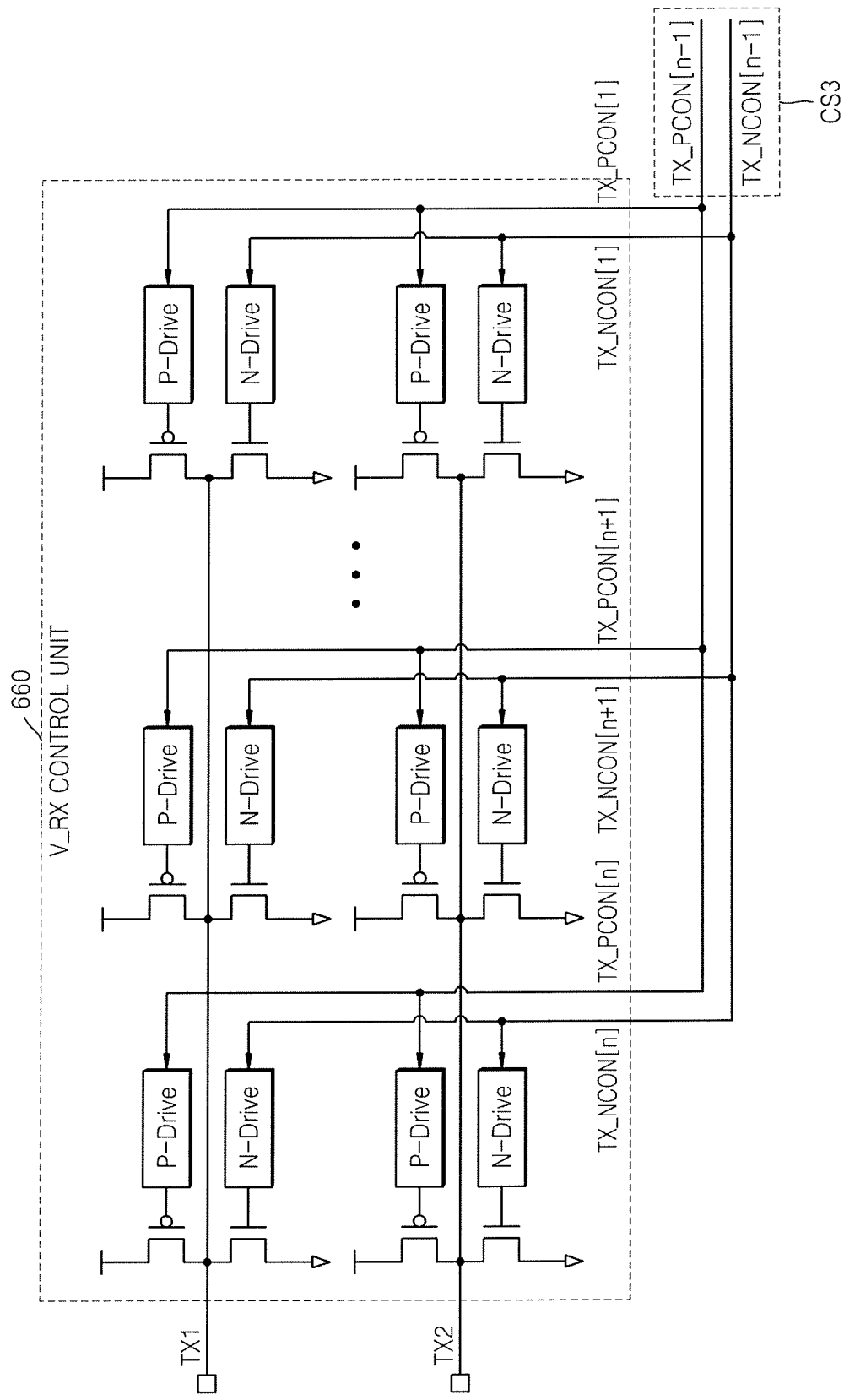
FIG. 14 illustrates a detailed structure of a received voltage control unit according to an exemplary embodiment of the inventive concept.

FIG. 14 illustrates a detailed structure of the received voltage control unit 660 shown in FIG. 11 according to an exemplary embodiment of the inventive concept.

Referring to FIG. 14, the received voltage control unit 660 may include a plurality of pull-down transistors at which a source terminal is grounded, and a plurality of pull-up transistors at which a source terminal is connected to a predetermined voltage. The received voltage control unit 660 may be formed of a circuit that functions, for example, as a transmitter in a reader mode of NFC. The pull-down and pull-up transistors have internal resistances. Accordingly, when the pull-down transistors are turned on, heat resulting from some RF signals may be radiated through an internal resistance.

Figure 15:
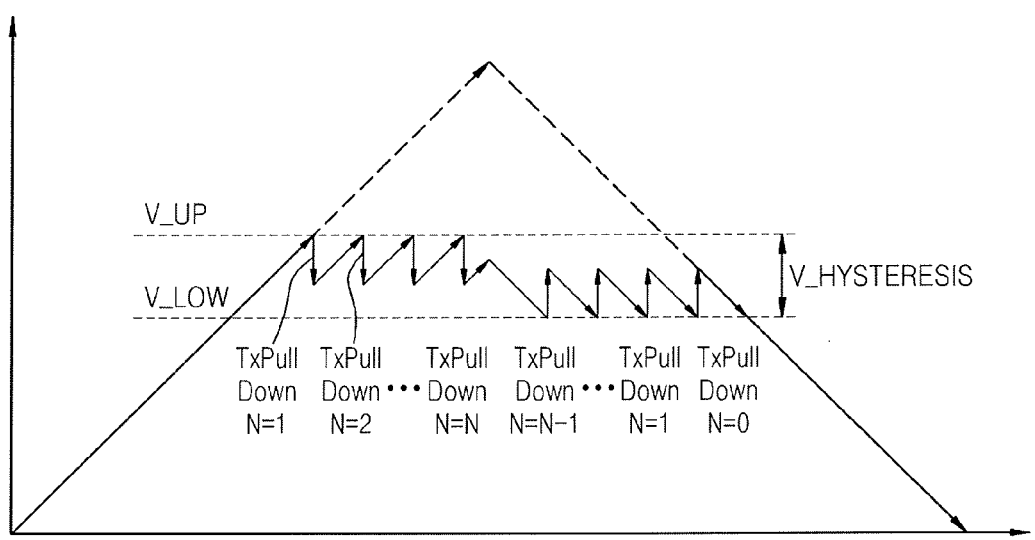
FIG. 15 is a diagram illustrating the operation of a received voltage control unit according to an exemplary embodiment of the inventive concept.

FIG. 15 is a diagram illustrating the operation of the received voltage control unit 660 according to an exemplary embodiment of the inventive concept.

Referring to FIG. 15, if the strength of an RF signal is equal to or greater than V_UP, the received voltage control unit 660 turns on one pull-down transistor. If the strength of the RF signal is continuously V_UP or higher, the received voltage control unit 660 sequentially turns on each pull-down transistor. If the strength of the RF signal is lower than V-LOW, the received voltage control unit 660 turns off one pull-down transistor. If the strength of the RF signal is continuously V-LOW or lower, the received voltage control unit 660 sequentially turns off each pull-down transistor. Here, the pull-up transistor is maintained in a turned-off state. The third control signal CS3 may include information for controlling operations of the pull-up and pull-down transistors.

Figure 16:
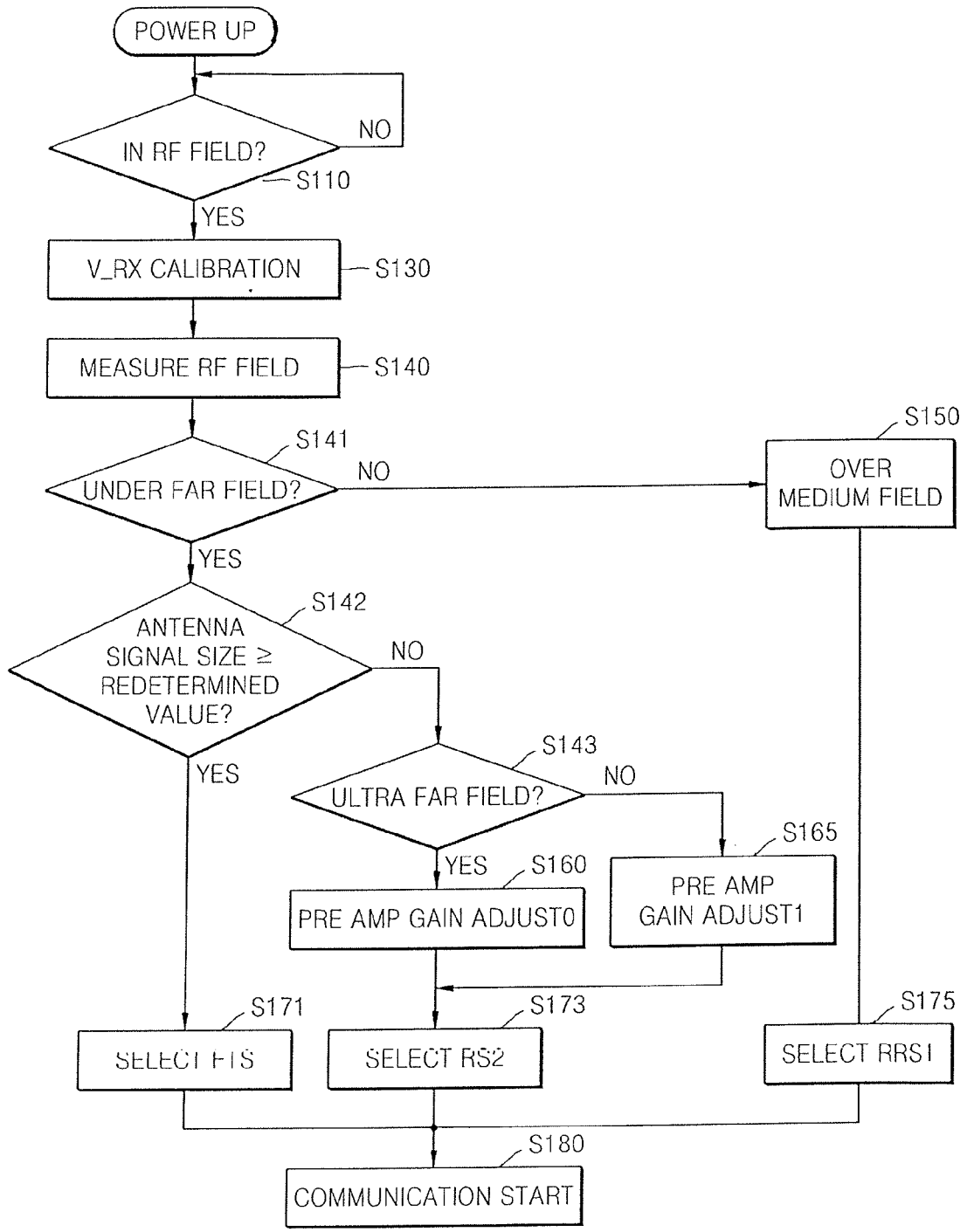
FIG. 16 is a flowchart illustrating the operation of an NFC terminal according to an exemplary embodiment of the inventive concept.

FIG. 16 is a flowchart illustrating the operation of the NFC terminal 600 according to an exemplary embodiment of the inventive concept.

Referring to FIG. 16, once the NFC terminal 600 has been turned on, it is determined whether the NFC terminal 600 has entered an RF field in operation S110. If the NFC terminal 600 has entered the RF field, the control unit 640 measures a strength of the RF field, and the received voltage control unit 660 adjusts the strength of a received RF voltage until the received RF voltage is within a predetermined range in operation S130. When the strength of the received RF voltage is within a predetermined range, the NFC terminal 600 measures the RF field in operation S140. The NFC terminal 600 then checks whether the RF field corresponds to a far range field in operation S141.

If the RF field corresponds to a far range field, a communication protocol of the NFC terminal 600 is checked in operation S142. When the communication protocol corresponds to a protocol for which a size of an antenna signal is greater than or equal to a predetermined value (e.g., Type A communication (e.g., 106, 212 Kbps)), the operation unit 670 selects the filtering signal FTS in operation in S171. That is, upon determining that the communication protocol corresponds to a protocol for which a size of an antenna signal is greater than or equal to a predetermined value, the operation unit 670 selects the filtering signal FTS in operation in S171.

If the RF field corresponds to a far range field and a communication protocol of the NFC terminal 600 corresponds to a protocol for which a size of an antenna signal is less than a predetermined value, it is determined whether the RF field corresponds to an ultra far range field in operation S143, and a gain value of the amplifier 655 is adjusted in operation S160 or S165. The amplifier 655 adjusts the gain value, and the operation unit 670 selects a second received signal RS2 in operation S173.

If it is determined that the RF field does not correspond to a far range field in operation S141, the RF field is determined as a medium range field in operation S150, and the operation unit 670 selects a reduced first received signal RRS1 in operation S175.

The demodulator 690 determines a demodulating method according to a signal selected using the operation unit 670, and starts communication with an NFC terminal which is in a reader mode in operation S180.

Figure 17:
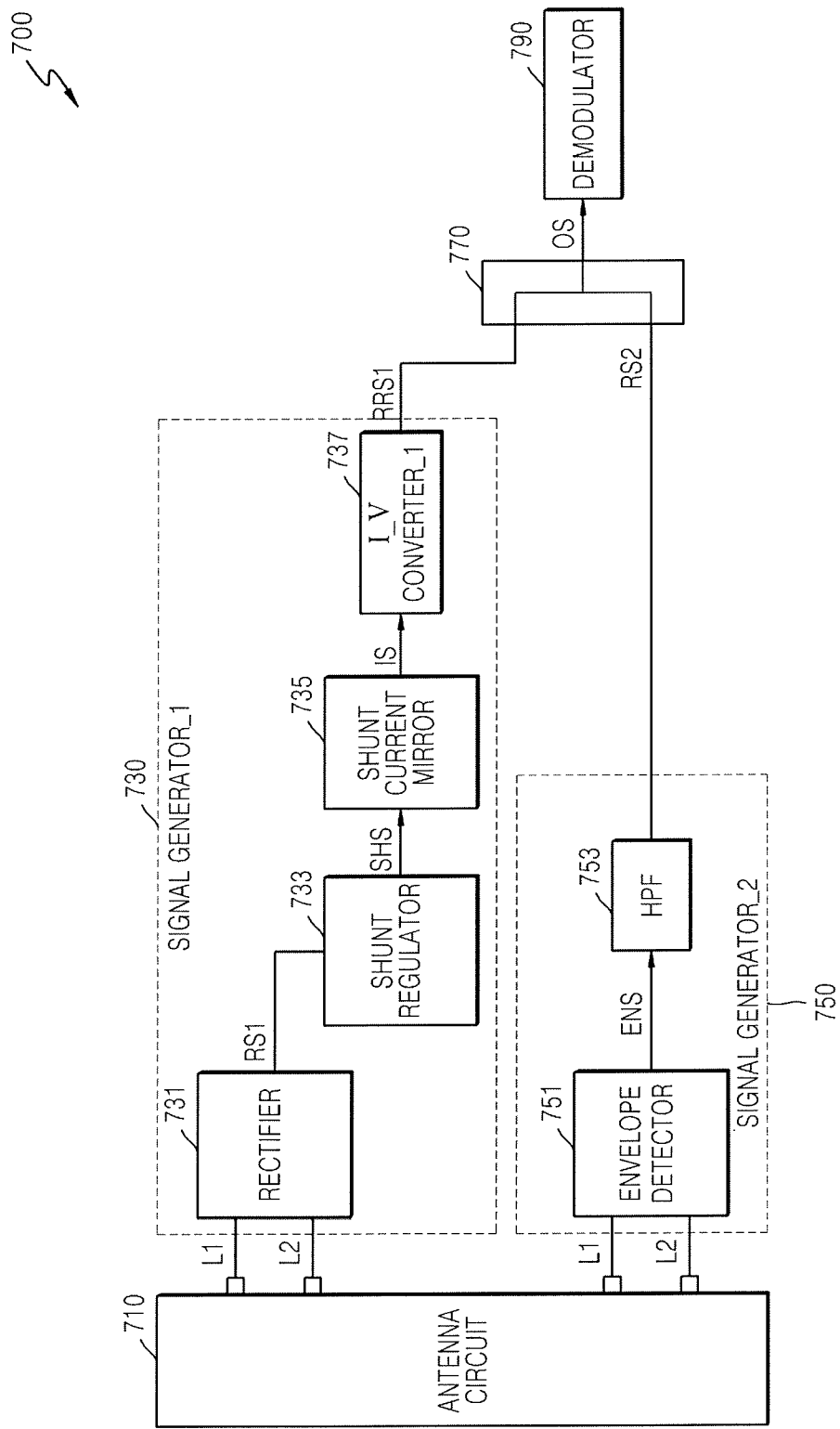
FIG. 17 is a block diagram illustrating an NFC terminal according to an exemplary embodiment of the inventive concept.

FIG. 17 is a block diagram illustrating an NFC terminal 700 according to an exemplary embodiment of the inventive concept.

Referring to FIG. 17, the NFC terminal 700 includes an antenna circuit 710, a first signal generator 730, a second signal generator 750, an operation unit 770, and a demodulator 790. The antenna circuit 710, the first signal generator 730, the second signal generator 750, and the demodulator 790 may respectively have the same structures as the antenna circuit 310, the first signal generator 330, the second signal generator 350, and the demodulator 390 of FIG. 5. Referring to the first signal generator 730, a rectifier 731, a shunt regulator 733, a shunt current mirror 735, and a first current-voltage converter 737 may respectively have the same structures as the rectifier 331, the shunt regulator 333, the shunt current mirror 335, and the first current-voltage converter 337 of FIG. 5. Referring to the second signal generator 750, an envelope detector 751 and a high pass filter 753 may respectively have the same structures as the envelope detector 351 and the high pass filter 353 of FIG. 5. For convenience of explanation, a description of elements and processes previously described may be omitted.

The operation unit 770 generates an operation signal OS by summing a reduced first received signal RRS1 and a second received signal RS2. The first signal generator 730 and the second signal generator 750 may be implemented such that when the strength of an RF field is equal to or greater than a first value (e.g., a first predetermined value), the second received signal RS2 is converged on a predetermined value, and when the strength of an RF field is less than the first value, the reduced first received signal RRS1 is converged on a predetermined value. Accordingly, the operation signal OS obtained by summing the reduced first received signal RRS1 and the second received signal RS2 may have a shape of the reduced first received signal RRS1 when the strength of an RF field is equal to or greater than the first value, and may have a shape of the second received signal RS2 when the strength of an RF field is smaller than the first value.

Figure 18:
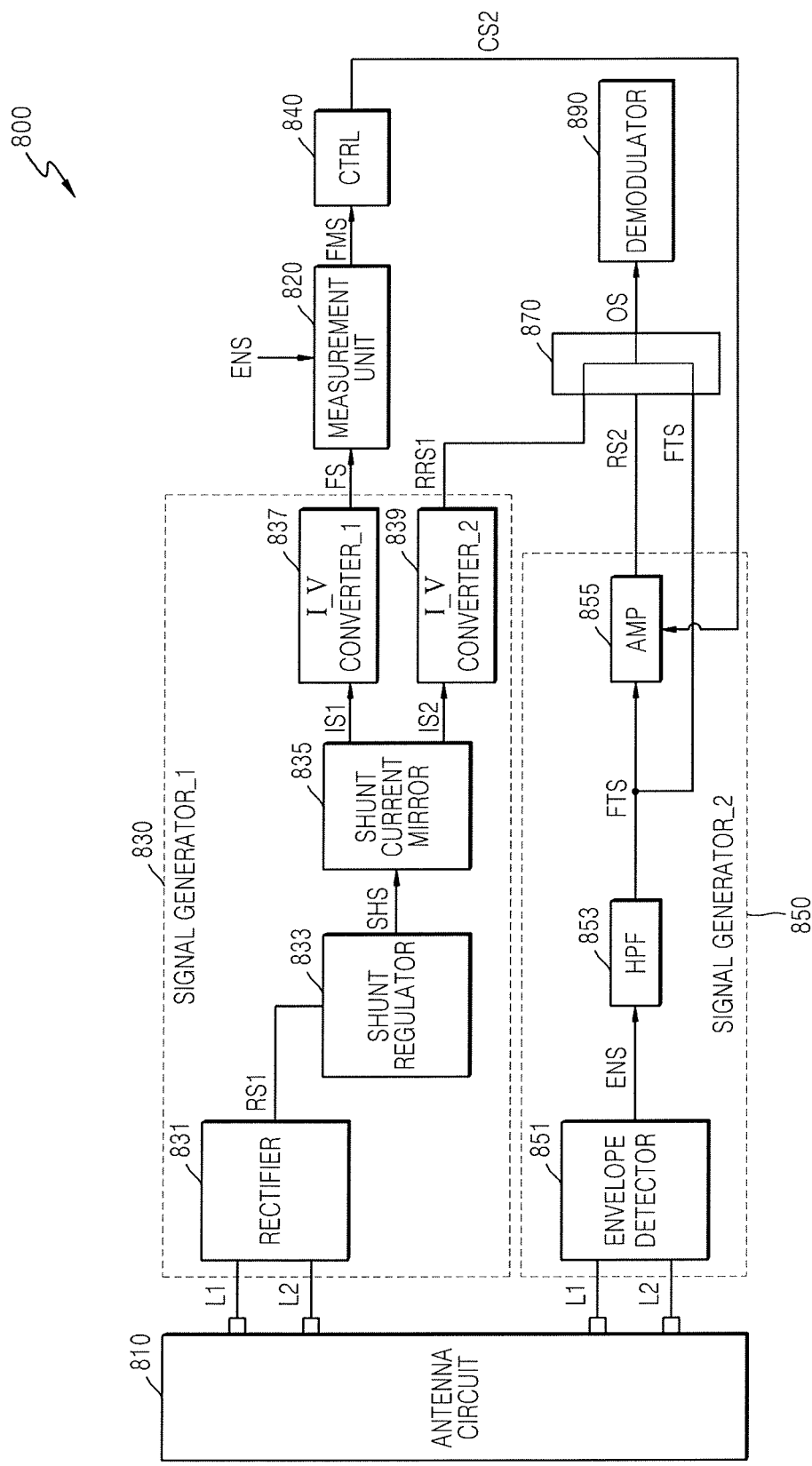
FIG. 18 is a block diagram illustrating an NFC terminal according to an exemplary embodiment of the inventive concept.

FIG. 18 is a block diagram illustrating an NFC terminal 800 according to an exemplary embodiment of the inventive concept.

Referring to FIG. 18, the NFC terminal 800 includes an antenna circuit 810, a field measurement unit 820, a first signal generator 830, a control unit 840, a second signal generator 850, an operation unit 870, and a demodulator 890. The antenna circuit 810, the field measurement unit 820, the first signal generator 830, the control unit 840, the second signal generator 850, and the demodulator 890 may respectively have the same structures as the antenna circuit 510, the field measurement unit 520, the first signal generator 530, the control unit 540, the second signal generator 550, and the demodulator 590 of FIG. 9. Referring to the first signal generator 830, a rectifier 831, a shunt regulator 833, a shunt current mirror 835, a first current-voltage converter 837, and a second current-voltage converter 839 may respectively have the same structures as the rectifier 531, the shunt regulator 533, the shunt current mirror 535, the first current-voltage converter 537, and the second current-voltage converter 539 of FIG. 9. Referring to the second signal generator 850, an envelope detector 851, a high pass filter 853, and an amplifier 855 may respectively have the same structures as the envelope detector 551, the high pass filter 553, and the amplifier 555 of FIG. 9. For convenience of explanation, a description of elements and processes previously described may be omitted.

The operation unit 870 generates an operation signal OS by summing a reduced first received signal RRS1, a second received signal RS2, and a filtering signal FTS. In an exemplary embodiment, the first received signal RRS1, the second received signal RS2, and the filtering signal FTS are different from each other. The first signal generator 830 and the second signal generator 850 may be implemented such that when the strength of an RF field is equal to or greater than a first value (e.g., a first predetermined value), the second received signal RS2 and the filtering signal FTS are converged on a predetermined value, and when the strength of an RF field is less than the first value and equal to or greater than a second value (e.g., a second predetermined value), the reduced first received signal RRS1 and the second received signal RS2 are converged on a predetermined value. In addition, when the strength of an RF field is smaller than the second value, the reduced first received signal RRS1 and the filtering signal FTS are converged on a predetermined value.

Accordingly, the operation signal obtained by summing the reduced first received signal RRS1, the second received signal RS2, and the filtering signal FTS may have a shape of the reduced first received signal RRS1, the second received signal RS2, or the filtering signal FTS, according to the strength of an RF field.

Accordingly, the NFC terminal 800 according to an exemplary embodiment of the inventive concept generates the reduced first received signal RRS1, the second received signal RS2, and the filtering signal FTS using different methods according to the strength of the RF signal, and may increase an operating range of the NFC terminal 800 by summing the reduced first received signal RRS1, the second received signal RS2, and the filtering signal FTS.

Figure 19:
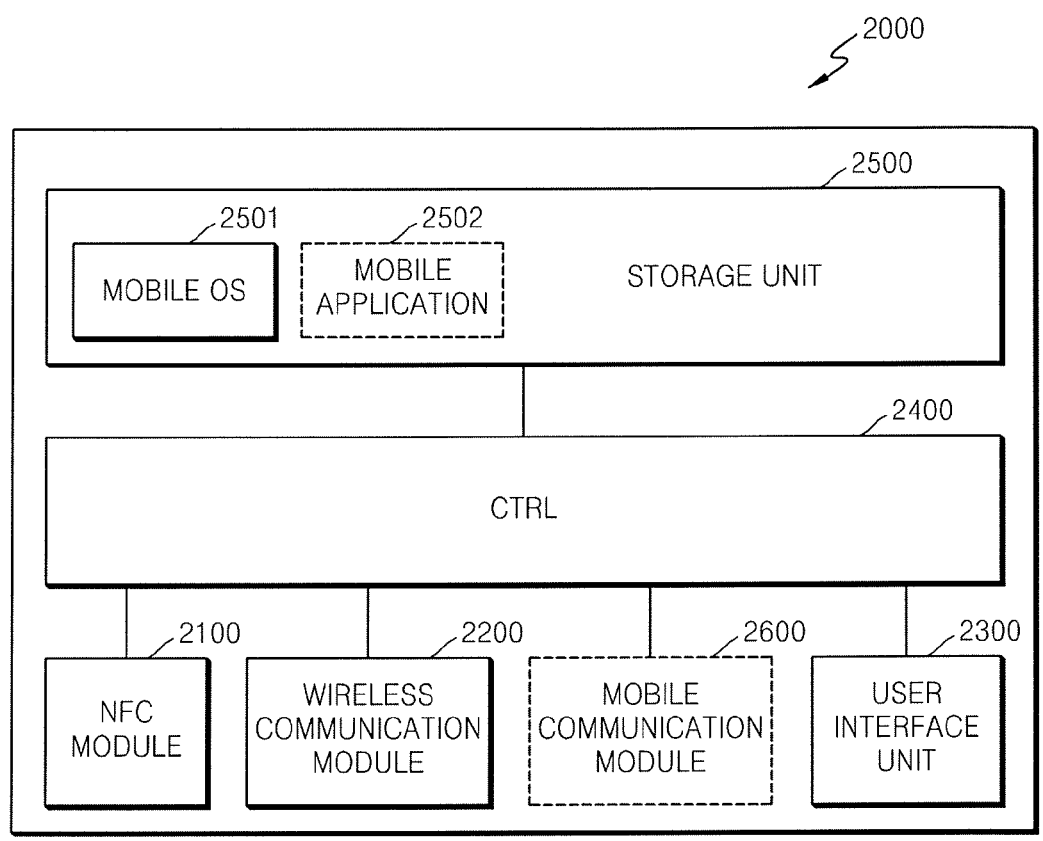
FIG. 19 is a block diagram illustrating a mobile terminal according to an exemplary embodiment of the inventive concept.

FIG. 19 is a block diagram illustrating a mobile terminal 2000 according to an exemplary embodiment of the inventive concept. The mobile terminal 2000 may be implemented in various forms. For example, the mobile terminal 2000 may be, but is not limited to, a mobile phone, a smartphone, a laptop computer, a digital broadcasting terminal, a personal digital assistant (PDA), a portable multimedia player (PMP), a navigation device, a tablet PC, etc.

Referring to FIG. 19, the mobile terminal 2000 includes an NFC module 2100, a wireless communication module 2200, a mobile communication module 2600, a user interface unit 2300, a control unit 2400, and a storage unit 2500. It will be understood by one of ordinary skill in the art that the mobile terminal 2000 may include other additional general purpose components. For example, the mobile terminal 2000 may further include other general-purpose components such as a camera module, a digital multimedia broadcasting (DMB) module, a global positioning system (GPS) module, an image or speech processing processor, a power supply unit, a vibration motor, a speaker, a microphone, a main board, etc. According to exemplary embodiments, the mobile terminal 2000 may include some or all of the components shown in FIG. 19. That is, the mobile terminal 2000 may be implemented with more or less components than those illustrated in FIG. 19. For example, if the mobile terminal 2000 is a tablet PC used only for wireless Internet, the mobile communication module 2600 may be omitted.

The NFC module 2100 performs NFC operations. The NFC module 2100 may include, for example, an antenna and an NFC chipset. The NFC chipset includes circuit elements to operate in a reader or writer mode, a peer-to-peer (P2P) mode, or a card emulation mode. When the NFC module 2100 is in a reader or writer mode and the NFC tag is located within an RF field coverage (NFC tagging), the NFC module 2100 reads data recorded on an NFC tag (reader mode), or records or modifies predetermined information to or on an NFC tag (writer mode). In addition, when the NFC module 2100 approaches an NFC terminal including an NFC chip set, the modules may operate in a peer-to-peer (P2P) mode to carry out transmitting and receiving data in a bilateral manner. When operating in a card emulation mode, the NFC module 2100 may operate similarly to an active or passive NFC tag. The NFC module 2100 may include some or all of the components of the NFC terminals 100, 200, 300, 400, 500, 600, 700, and 800 according to the exemplary embodiments of the inventive concept described herein.

The NFC module 2100 obtains information recorded to an NFC tag via NFC tagging. The NFC module 2100 may convert to a writer mode from a reader mode and vice versa in response to a request by the control unit 2400.

The wireless communication module 2200 sets a wireless connection with respect to other wireless communication devices, and exchanges data via the wireless connection.

The mobile communication module 2600 accesses a circuit switching network and a packet switching network to transmit or receive data used for mobile communication. The mobile communication module 2600 may download predetermined applications through the packet switching network.

The user interface 2300 may be, for example, a touchscreen which a user uses to operate the mobile terminal 2000 or to display information processed using the mobile terminal 2000.

The storage unit 2500 may store a program for processing and controlling the control unit 2400, and may perform functions for storing input or output data. A mobile operating system (OS) 2501 may be stored in the storage unit 2500, and the control unit 2400 may control the mobile terminal 2000 by executing the mobile OS 2501. In addition, the mobile terminal 2000 may utilize web storage that performs a storage function of the storage unit 2500 on the Internet.

The control unit 2400 controls an overall operation of the mobile terminal 2000. For example, the control unit 2400 may perform controlling and processing in relation to content capturing, a voice call, data communication, a video call, etc. The control unit 2400 controls the NFC module 2100, the wireless communication module 2200, the mobile communication module 2600, the user interface unit 2300, and the storage unit 2500 by executing the mobile OS 2501 and a mobile application 2502 stored in the storage unit 2500.

The mobile terminal 2000 according to an exemplary embodiment of the inventive concept may increase an operating range of an NFC terminal by including the NFC module 2100.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A near field communication (NFC) terminal, comprising:
    a first signal generator configured to generate a first received signal using a radio frequency (RF) signal received through an antenna, and generate a reduced first received signal by reducing a size of the first received signal when the size of the first received signal is equal to or greater than a predetermined RF value;
    a second signal generator configured to generate a second received signal using the RF signal; and
    an operation unit configured to generate an operation signal by performing an operation on the reduced first received signal and the second received signal, and transmit the operation signal to a demodulator.

2. The NFC terminal of claim 1, wherein the first signal generator comprises:
    a rectifier configured to generate the first received signal by rectifying the RF signal;
    a shunt regulator configured to generate a shunt signal by shunting the first received signal when the size of the first received signal is equal to or greater than a predetermined shunt value;
    a current mirror configured to generate a first shunt current and a second shunt current based on the shunt signal;
    a first current-voltage converter configured to generate a field signal using the first shunt current; and
    a second current-voltage converter configured to generate the reduced first received signal using the second shunt current.

3. The NFC terminal of claim 1, wherein the second signal generator comprises:
    an envelope detector configured to generate an envelope signal by detecting an envelope of the RF signal; and
    a high pass filter configured to generate the second received signal by high-pass filtering the envelope signal.

4. The NFC terminal of claim 1, further comprising:
    a field measurement unit configured to receive a field signal, generate a field measurement signal using the field signal, and measure a strength of the RF signal; and
    a control unit configured to generate a first control signal according to the field measurement signal,
    wherein the field signal is generated by the first signal generator using the first received signal.

5. The NFC terminal of claim 4, further comprising:
    a received voltage control unit configured to adjust a strength of an RF voltage received by the antenna according to a third control signal,
    wherein the third control signal is generated by the control unit based on the field measurement signal.

6. The NFC terminal of claim 4,
    wherein the control unit is configured to generate a fourth control signal according to the field measurement signal,
    wherein the first signal generator comprises a sink circuit configured to reduce the size of the first received signal according to the fourth control signal.

7. The NFC terminal of claim 4, wherein the operation unit is a multiplexer configured to generate the operation signal by selecting the reduced first received signal or the second received signal according to the first control signal.

8. The NFC terminal of claim 4, wherein the second signal generator comprises:
    an envelope detector configured to generate an envelope signal by detecting an envelope of the RF signal;
    a high pass filter configured to generate a filtering signal by high-pass filtering the envelope signal; and
    an amplifier configured to generate the second received signal by amplifying the filtering signal.

9. The NFC terminal of claim 8,
    wherein the control unit is configured to generate a second control signal according to the field measurement signal,
    wherein the amplifier is configured to amplify the filtering signal according to the second control signal.

10. The NFC terminal of claim 9, wherein the operation unit is a multiplexer configured to generate the operation signal by selecting one of the first received signal, the second received signal, and the filtering signal according to the first control signal.

11. The NFC terminal of claim 1, wherein the operation performed by the operation unit is a summation of the reduced first received signal and the second received signal.

12. The NFC terminal of claim 11, wherein the first signal generator comprises:
    a rectifier configured to generate the first received signal by rectifying the RF signal;
    a shunt regulator configured to generate the reduced first received signal using a shunt signal of the first received signal;
    a current mirror configured to generate a shunt current based on the reduced first received signal; and
    a current-voltage converter configured to generate a field signal based on the shunt current.

13. The NFC terminal of claim 1, wherein the operation performed by the operation unit is an arithmetic operation or a logical operation.

14. A communication device including a near field communication (NFC) terminal, comprising:
    a first signal generator configured to generate a first received signal using a radio frequency (RF) signal received through an antenna, and generate a reduced first received signal by reducing a size of the first received signal when the size of the first received signal is equal to or greater than a predetermined RF value;
    a second signal generator configured to generate a second received signal using the RF signal; and
    an operation unit configured to generate an operation signal by performing an operation on the reduced first received signal and the second received signal, and transmit the operation signal to a demodulator.

15. The communication device of claim 14, wherein the first signal generator comprises:
    a rectifier configured to generate the first received signal by rectifying the RF signal;
    a shunt regulator configured to generate a shunt signal by shunting the first received signal when the size of the first received signal is equal to or greater than a predetermined shunt value;
    a current mirror configured to generate a first shunt current and a second shunt current based on the shunt signal;
    a first current-voltage converter configured to generate a field signal using the first shunt current; and a second current-voltage converter configured to generate the reduced first received signal using the second shunt current.

16. The communication device of claim 14, wherein the second signal generator comprises:
an envelope detector configured to generate an envelope signal by detecting an envelope of the RF signal; and
a high pass filter configured to generate the second received signal by high-pass filtering the envelope signal.

17. The communication device of claim 14, wherein the operation performed by the operation unit is an arithmetic operation or a logical operation.

* * * * *